United States Patent
Furusawa et al.

(10) Patent No.: US 7,912,215 B2
(45) Date of Patent: Mar. 22, 2011

(54) DATA TRANSMISSION APPARATUS, DATA RECEIVING APPARATUS AND METHOD EXECUTED THEREOF

(75) Inventors: Satoshi Furusawa, Osaka (JP); Masaru Fuse, Osaka (JP); Tsuyoshi Ikushima, Nara (JP); Tomokazu Sada, Osaka (JP)

(73) Assignee: Panasonic Corporation, Osaka (JP)

( * ) Notice: Subject to any disclaimer, the term of this patent is extended or adjusted under 35 U.S.C. 154(b) by 1095 days.

(21) Appl. No.: 11/655,981

(22) Filed: Jan. 22, 2007

(65) Prior Publication Data

US 2007/0182607 A1 Aug. 9, 2007

(30) Foreign Application Priority Data

Feb. 7, 2006 (JP) .................................. 2006-029772

(51) Int. Cl.
H04L 9/22 (2006.01)
H04K 1/00 (2006.01)

(52) U.S. Cl. .............. 380/43; 380/37; 380/42; 714/776; 375/264

(58) Field of Classification Search .................... 380/37, 380/42, 43
See application file for complete search history.

(56) References Cited

U.S. PATENT DOCUMENTS

| 5,515,437 | A | * | 5/1996 | Katta et al. | 380/217 |
| 5,706,346 | A | * | 1/1998 | Katta et al. | 380/217 |
| 2002/0085716 | A1 | * | 7/2002 | Abdulkader | 380/205 |
| 2004/0146014 | A1 | * | 7/2004 | Hammons et al. | 370/320 |
| 2006/0072753 | A1 | * | 4/2006 | Nishimura | 380/262 |
| 2007/0183593 | A1 | * | 8/2007 | Yoshida et al. | 380/28 |
| 2007/0211786 | A1 | * | 9/2007 | Shattil | 375/141 |
| 2008/0044011 | A1 | * | 2/2008 | Yoshida et al. | 380/28 |
| 2010/0158249 | A1 | * | 6/2010 | Ikushima et al. | 380/255 |

FOREIGN PATENT DOCUMENTS

JP 09-205420 8/1997

* cited by examiner

*Primary Examiner* — Emmanuel L Moise
*Assistant Examiner* — Tamara Teslovich
(74) *Attorney, Agent, or Firm* — Wenderoth, Lind & Ponack, L.L.P.

(57) ABSTRACT

A data transmitting apparatus generates, by using predetermined first key information and information data, a multi-level signal in which a signal level changes so as to be approximately random numbers, and converts the multi-level signal into a modulated signal, in a predetermined modulation method and transfer the same. A data receiving apparatus demodulates the modulated signal so as to be converted into a multi-level signal, and reproduces information data from the multi-level signal, using second key information which has the same content as first key information used by the data transmitting apparatus.

5 Claims, 11 Drawing Sheets

F I G. 1 1  PRIOR ART
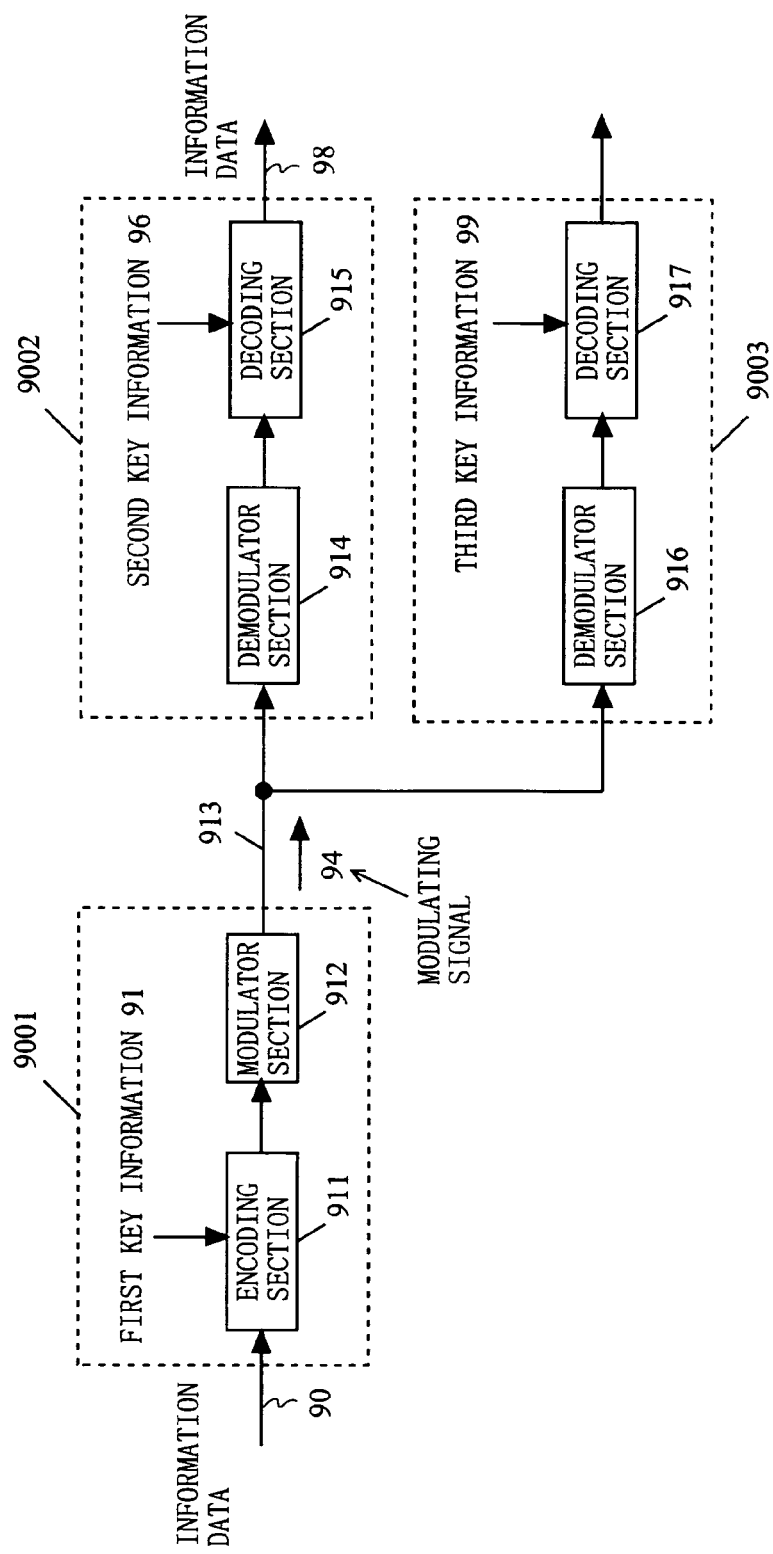

US 7,912,215 B2

DATA TRANSMISSION APPARATUS, DATA RECEIVING APPARATUS AND METHOD EXECUTED THEREOF

BACKGROUND OF THE INVENTION

1. Field of the Invention

The present invention relates to apparatuses for performing cipher communication in order to prevent illegal eavesdropping and interception by a third party, and more particularly, relates to a data transmitting apparatus, a data receiving apparatus, and a method executed thereby for performing data communication through selecting and setting a specific encoding/decoding (modulating/demodulating) method between a legitimate transmitter and a legitimate receiver.

2. Description of the Background Art

Conventionally, in order to perform communication between specific parties, there has been adopted a structure for realizing secret communication by sharing key information for encoding/decoding between transmitting and receiving ends, and by performing, based on the key information, an operation/inverse operation on information data (plain text) to be transmitted, in a mathematical manner. FIG. 11 shows a configuration of a conventional data communication apparatus based on the above-described structure.

In FIG. 11, the conventional data communication apparatus has a configuration in which a data transmitting apparatus 9001 and a data receiving apparatus 9002 are connected to each other via a transmission line 913. The data transmitting apparatus 9001 includes an encoding section 911 and a modulator section 912. The data receiving apparatus 9002 includes a demodulator section 914 and a decoding section 915.

In the data transmitting apparatus 9001, information data 90 and first key information 91 are inputted to the encoding section 911. The encoding section 911 encodes (encrypts), based on the first key information 91, the information data 90. The modulator section 912 converts the information data encrypted by the encoding section 911 into a modulated signal 94 in a predetermined modulation method and transmits the same to the transmission line 913.

In the data receiving apparatus 9002, the demodulator section 914 demodulates, in a predetermined demodulation method, the modulated signal 94 transmitted via the transmission line 913. To the decoding section 915, second key information 96 which has the same content as the first key information 91, which is shared with the encoding section 911, is inputted. The decoding section 915 decodes (decrypts) the modulated signal 94 in accordance with the second key information 96 and outputs the original information data 98.

Here, by using an eavesdropper's data receiving apparatus 9003, eavesdropping by a third party will be described. In FIG. 11, the eavesdropper's data receiving apparatus 9003 includes an eavesdropper's demodulator section 916 and an eavesdropper's decoding section 917. The eavesdropper's demodulator section 916 eavesdrops on the modulated signal 94 transmitted between the data transmitting apparatus 9001 and the data receiving apparatus 9002, and decodes the eavesdropped modulated signal 94 in a predetermined demodulation method. The eavesdropper's decoding section 917 attempts decoding of the demodulated information data, in accordance with third key information 99. Here, due to no key information sharing with the encoding section 911, the third key information 99 is different in content from the first key information 91. Therefore, the eavesdropper's decoding section 917 cannot accurately reproduce the original information data 90 inputted to the encoding section 911 even if the decoding is performed based on the third key information 99.

A mathematical encryption (or also referred to as a computational encryption or a software encryption) technique based on such mathematical operation may be applicable to an access system as described, for example, in Japanese Laid-Open Patent Publication No. 9-205420 (hereinafter referred to as patent document 1). That is, in a PON (Passive Optical Network) structure in which an optical signal transmitted from an optical transmitter is divided by an optical coupler, and distributed to optical receivers at a plurality of optical subscribers' houses, such optical signals that are not desired and aimed at other subscribers are inputted to each of the optical receivers. Therefore, information data for each of the subscribers is encrypted by using key information which is different by the subscribers, whereby it is possible to prevent a leakage/eavesdropping of mutual information and realize safe data communication.

However, in the case of the conventional data communication apparatus based on the mathematical encryption technique, even if the eavesdropper does not share the key information, it is theoretically possible for the eavesdropper to succeed in decryption, with respect to a cipher text (modulated signal or encrypted information data), by means of an operations using all possible combinations of key information (an all-possible attack), or by means of a special analysis algorithm. Particularly, improvement in the processing speeds of computers has been remarkable in recent years, and thus there is a problem in that if a new computer based on a novel principle such as a quantum computer is realized in the future, it is possible to eavesdrop on the cipher text easily within finite lengths of time.

SUMMARY OF THE INVENTION

Therefore, an object of the present invention is to provide a data transmitting apparatus and a data receiving apparatus which cause an eavesdropper to take a significantly increased time to analyze a cipher text and consequently realize highly concealable data communication.

The present invention is directed to a data transmitting apparatus and a method for performing cipher communication. To attain the above object, the data transmitting apparatus of the present invention includes a multi-level code generation section, a combining section, an error-correction encoding section, a multi-level processing section, and a modulator section. The data transmitting method of the present invention is realized by executing respective steps included in the method.

The multi-level code generation section generates, by using predetermined key information, a multi-level code sequence in which a signal level changes so as to be approximately random numbers. The combining section combines accompanying data to the multi-level code sequence with predetermined frequency and generates a combined multi-level signal. The error-correction encoding section adds an error-correction code to information data, in accordance with predetermined error correction encoding processing, and outputs error-correction encoded information data. The multi-level processing section combines the combined multi-level signal and the error-correction encoded information data in accordance with predetermined processing, and generates a multi-level signal having a level uniquely corresponding to a combination of levels of the combined signals. The modulator section generates a modulated signal, in a predetermined modulation method, based on the multi-level signal.

The accompanying data is a synchronous signal which is synchronizing with the information data, an N frequency-dividing clock of the information data, or a predetermined code-synchronous pattern.

Further, the present invention is also directed to a data receiving apparatus and a method for performing cipher communication. To attain the above object, the data receiving apparatus of the present invention includes a demodulator section, a multi-level code generation section, a multi-level identification section, and an error-correction decoding section. The data receiving method of the present invention is realized by executing respective steps included in the method.

The demodulator section demodulates a modulated signal, in a predetermined modulation method, generated based on error-correction encoded information data and a combined multi-level signal having accompanying data included therein, and outputs a multi-level signal obtained by the demodulation. The multi-level code generation section generates, by using predetermined key information, a multi-level code sequence in which a signal level changes so as to be approximately random numbers. The multi-level identification section identifies the multi-level signal in accordance with the multi-level code sequence, and outputs data which is identified and reproduced. The error-correction decoding section detects, from the data reproduced by the multi-level identification section, difference between the combined multi-level signal and the multi-level code sequence, in accordance with predetermined error-correction decoding processing, and outputs a result of the detection as the accompanying data, and also outputs information which is error-correction decoded as the information data.

Here, in the case where the multi-level code generation section generates, by using predetermined key information and a synchronous signal, a multi-level code sequence in which a signal level changes so as to be approximately random numbers, it is possible to further include a synchronous extraction section for inputting the accompanying data, extracting a synchronous signal synchronizing with the accompanying data in accordance with a predetermined procedure, and outputting the extracted synchronous signal to the multi-level code generation section.

It is preferable that the synchronous extraction section inputs a predetermined code-synchronizing pattern and accompanying data, extracts the synchronous signal synchronizing with the accompanying data in accordance with a predetermined procedure, and outputs the extracted synchronous signal to the multi-level code generation section.

According to the present invention, the information data is encoded/modulated into the multi-level signal by using the key information, and the received multi-level signal is decoded/demodulated, by using a common key information, whereby a signal-to-noise power ratio is adjusted appropriately. Accordingly, time for analyzing a cipher text is increased significantly, whereby it is possible to perform highly concealable data communication.

Further, the error-correction code is added to the information data to be transmitted, and the multi-level code sequences respectively in the data transmitting apparatus and the data receiving apparatus are caused to be in discord with each other by using the accompanying data, whereby the data to be transmitted is encrypted, and an error of the receiving data occurring in the receiving apparatus is corrected. Accordingly, the information data and the accompanying data is transmitted/received simultaneously, whereby it is possible to provide a highly concealable data communication apparatus.

Further, the synchronous signal is extracted from the accompanying data, and multi-level signal is synchronized with and identified by the multi-level code sequence generated based on the synchronous signal, whereby it is possible to realize a data communication apparatus of a simple configuration having a synchronous system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a block diagram showing a configuration of a conventional data communication apparatus.

DETAILED DESCRIPTION OF THE INVENTION

Herein after, embodiments of the present invention will be described with reference to the drawings.

First Embodiment

Figure 1:
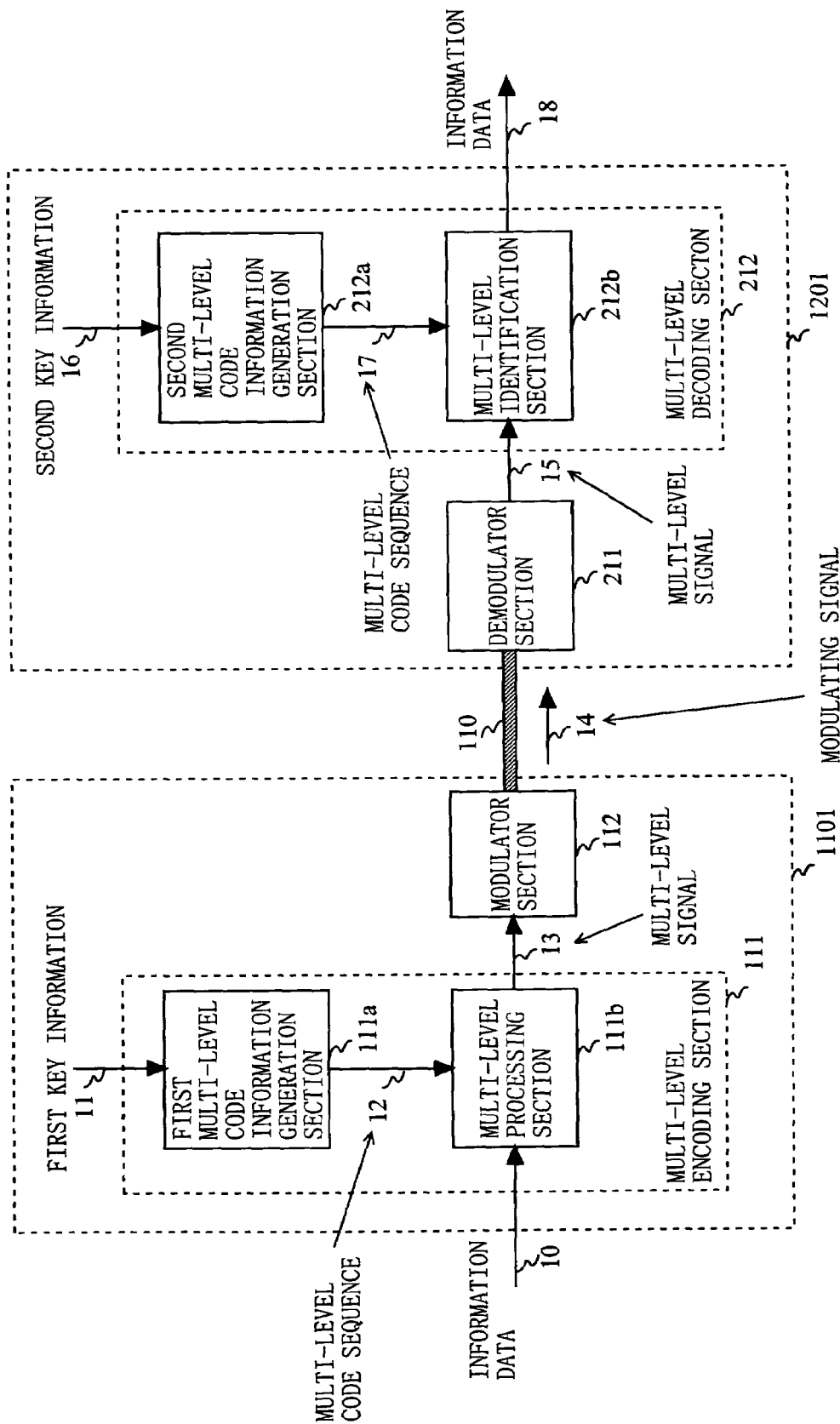
FIG. 1 is a block diagram showing a configuration of data communication apparatus according to a first embodiment of the present invention.

FIG. 1 is a block diagram showing a configuration of data communication apparatus according to a first embodiment of the present invention. In FIG. 1, the data communication apparatus according to the first embodiment has a configuration in which a data transmitting apparatus 1101 and a data receiving apparatus 1201 are connected to each other via a transmission line 110. The data transmitting apparatus 1101 includes a multi-level encoding section 111 and a modulator section 112. The multi-level encoding section 111 includes a first multi-level code generation section 111a and a multi-level processing section 111b. The data receiving apparatus 1201 includes a demodulator section 211 and a multi-level decoding section 212. The multi-level decoding section 212 includes a second multi-level code generation section 212a and a multi-level identification section 212b. As the transmission line 110, a metal line such as a LAN cable or a coaxial line, or an optical waveguide such as an optical-fiber cable can be used. Further the transmission line 110 is not limited to a wired cable such as the LAN cable, but can be free space which enables a wireless signal to be transmitted.

Figure 2:
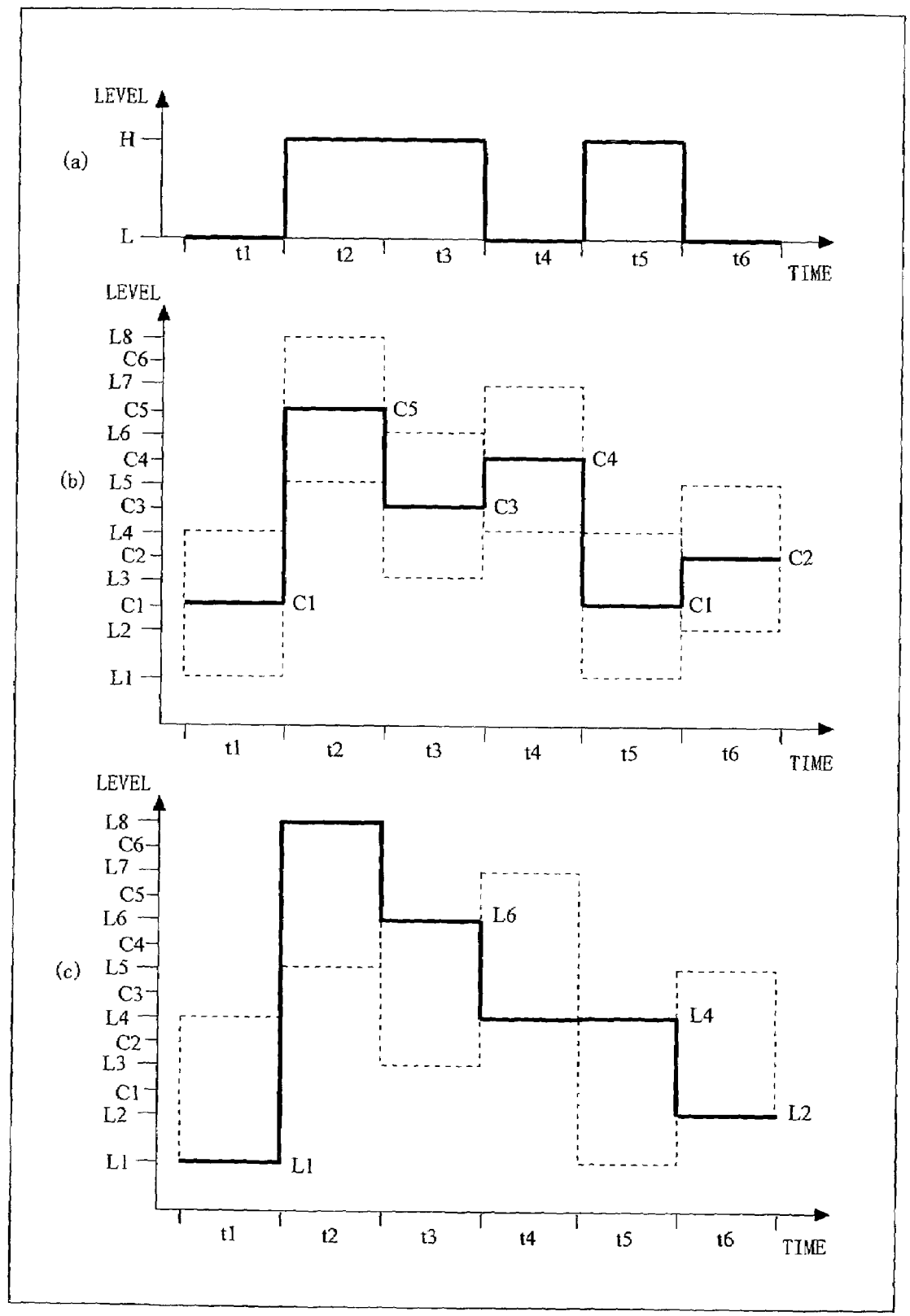
FIG. 2 is a diagram illustrating waveforms of a transmission signal of the data communication apparatus according to the first embodiment of the present invention.
Figure 3:
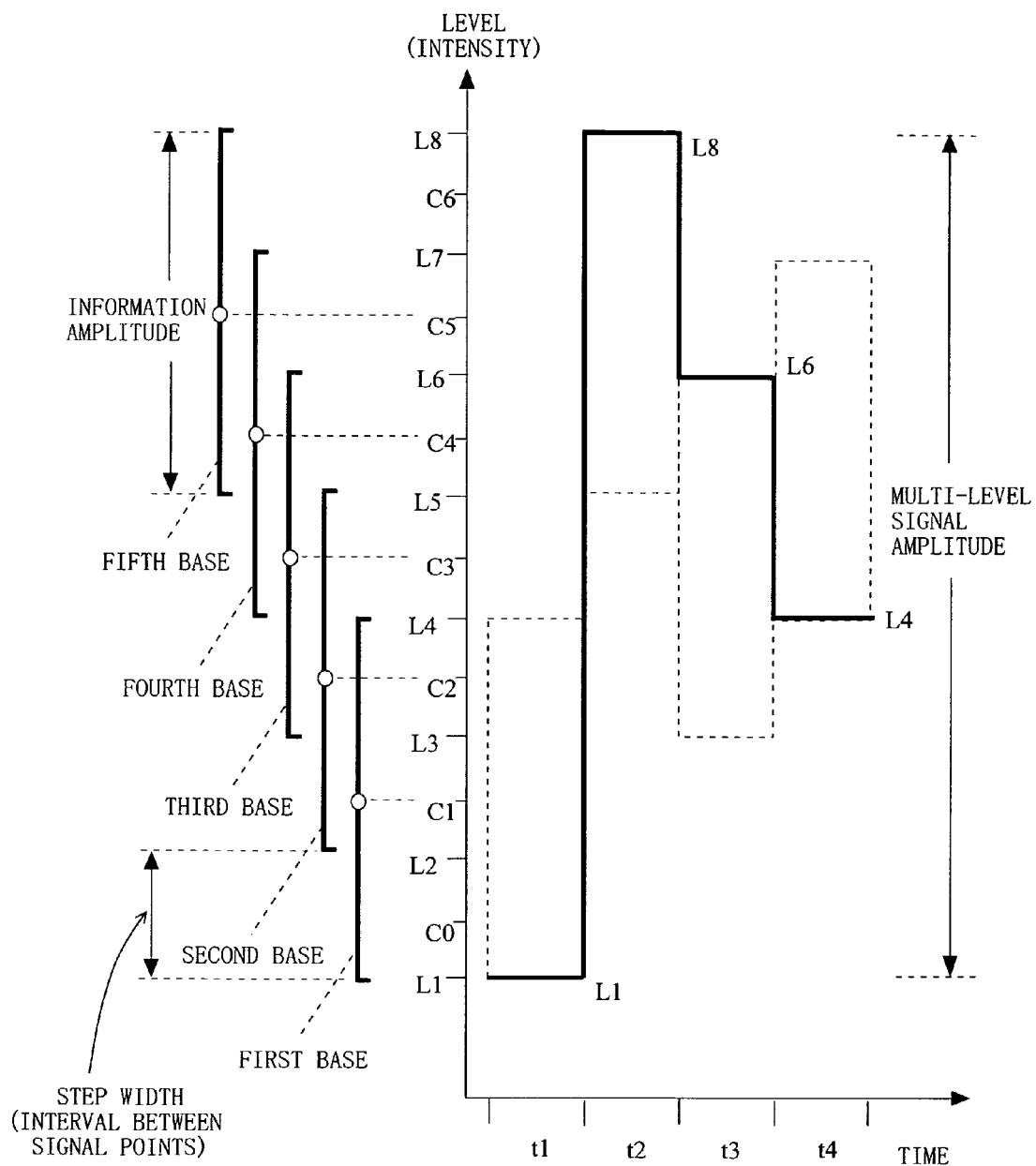
FIG. 3 is a diagram illustrating names of the waveforms of the transmission signal of the data communication apparatus according to the first embodiment of the present invention.

FIG. 2 and FIG. 3 are diagrams illustrating waveforms of a modulated signal 14 outputted from the modulator section 112. Hereinafter, with reference to FIG. 1 to FIG. 4, actions of the data communication apparatus according to the first embodiment will be described.

The first multi-level code generation section 111a generates, by using predetermined first key information 11, a multi-level code sequence 12 ((b) of FIG. 2) in which a signal level changes so as to be approximately random numbers. The multi-level code sequence 12 ((b) of FIG. 2) and information data 10 ((a) of FIG. 2) are inputted to the multi-level processing section 111b. The multi-level processing section 111b combines the multi-level code sequence 12 and the information data 10 in accordance with a predetermined procedure, and generates a multi-level signal 13 ((c) of FIG. 2) having a level corresponding to a combination of the both signal levels. For example, in the case where the level of the multi-level code sequence 12 changes to C1/C5/C3/C4 with respect to time slots t1/t2/t3/t4, the multi-level processing section 111b regards the level of the multi-level code sequence 12 as a bias level, adds the information data 10 to the multi-level code sequence 12, and then generates the multi-level signal 13 in which a signal level changes to L1/L8/L6/L4. The modulator section 112 modulates the multi-level signal 13 in a predetermined modulation method into the modulated signal 14 and transmits the same to the transmission line 110.

Here, as shown in FIG. 3, an amplitude of the information data 10 is referred to as an "information amplitude", a total amplitude of the multi-level signal 13 is referred to as a "multi-level signal amplitude", pairs of levels (L1, L4)/(L2, L5)/(L3, L6)/(L4, L7)/(L5, L8) which the multi-level signal 13 may take corresponding to levels c1/c2/c3/c4/c5 of the multi-level code sequence 12 are respectively referred to as a first to a fifth "bases", and a minimum interval between the signal levels of the multi-level signal 13 is referred to as a "step width".

The demodulator section 211 demodulates the modulated signal 14 transmitted via the transmission line 110, and reproduces a multi-level signal 15. The second multi-level code generation section 212a previously shares second key information 16 which has the same content as the first key information 11, and, generates, based on the second key information 16, a multi-level code sequence 17. The multi-level identification section 212b identifies (binary determination) the multi-level signal 15 by using the multi-level code sequence 17 as a threshold, and reproduces information data 18. Here, the modulated signal 14, in the predetermined modulation method, which is transmitted/received between the modulator section 112 and the demodulator section 211 via the transmission line 110, is obtained by modulating an electromagnetic wave (electromagnetic field) or an optical wave using the multi-level signal 13.

Note that the multi-level processing section 111b may generate the multi-level signal 13 by using any methods, in addition to a method of generating the multi-level signal 13 by adding up the information data 10 and the multi-level code sequence 12 as above described. For example, the multi-level processing section 111b may generate, based on the information data 10, the multi-level signal 13, by modulating an amplitude of the level of the multi-level code sequence 12. Alternatively, the multi-level processing section 111b may generate the multi-level signal 13 by reading out consecutively, from a memory having the level of the multi-level signal 13 stored therein, the level of the multi-level signal 13, which is corresponding to the combination of the information data 10 and the multi-level code sequence 12.

Further, in FIG. 2 and FIG. 3, the level of the multi-level signal 13 is represented as 8 levels, but the level of the multi-level signal 13 is not limited to the representation. Further, the information amplitude is represented as three times or integer times of the step width of the multi-level signal 13, but the information amplitude is not limited to the representation. The information amplitude may be any integer times of the step width of the multi-level signal 13, or is not necessarily the integer times thereof. Further, in FIG. 2 and FIG. 3, each of the levels of the multi-level code sequence 12 is located so as to be at an approximate center between each of the levels of the multi-level signal 13, but each of the levels of the multi-level code sequence 12 is not limited to such location. For example, each of the levels of the multi-level code sequence 12 is not necessarily at the approximate center between each of the levels of the multi-level signal 13, or may coincide with each of the levels of the multi-level signal 13. Further, the above description is based on an assumption that the multi-level code sequence 12 and the information data 10 are identical in a change rate to each other and also in a synchronous relation, but the change rate of either thereof may be faster (or slower) than the change rate of another, and further, the both may be in an asynchronous relation.

Next, eavesdropping on the modulated signal 14 by a third party will be described.

It is assumed that the third party, who is an eavesdropper, decodes the modulated signal 14 by using an apparatus having a configuration corresponding to the data receiving apparatus 1201 held by a legitimate receiving end or a further sophisticated data receiving apparatus (hereinafter referred to as an eavesdropper's data receiving apparatus). The eavesdropper's data receiving apparatus reproduces the multi-level signal 15 by demodulating the modulated signal 14. However, the eavesdropper's data receiving apparatus does not share key information with the data transmitting apparatus 1101, and thus, unlike the data receiving apparatus 1201, the eavesdropper's data receiving apparatus cannot generate the multi-level code sequence 17, based on the key information. Therefore, the eavesdropper's data receiving apparatus cannot perform binary determination of the multi-level signal 15 by using the multi-level code sequence 17 as a reference.

As an action of the eavesdropping which may be possible under these circumstances, there is a method of simultaneously performing identification of all levels of the multi-level signal 15 (generally referred to as an all-possible attack). That is, the eavesdropper's data receiving apparatus performs simultaneous determination of the multi-level signal 15 by preparing thresholds corresponding to all possible intervals between the respective signal levels which the multi-level signal 15 may take, and attempts extraction of correct key information or information data by analyzing a result of the determination. For example, the eavesdropper's data receiving apparatus sets all the levels c0/c1/c2/c3/c4/c5/c6 of the multi-level code sequence 12 shown in FIG. 2 as the thresholds, and performs the multi-level determination with respect to the multi-level signal 15, thereby attempting the extraction of the correct key information or the information data.

Figure 4:
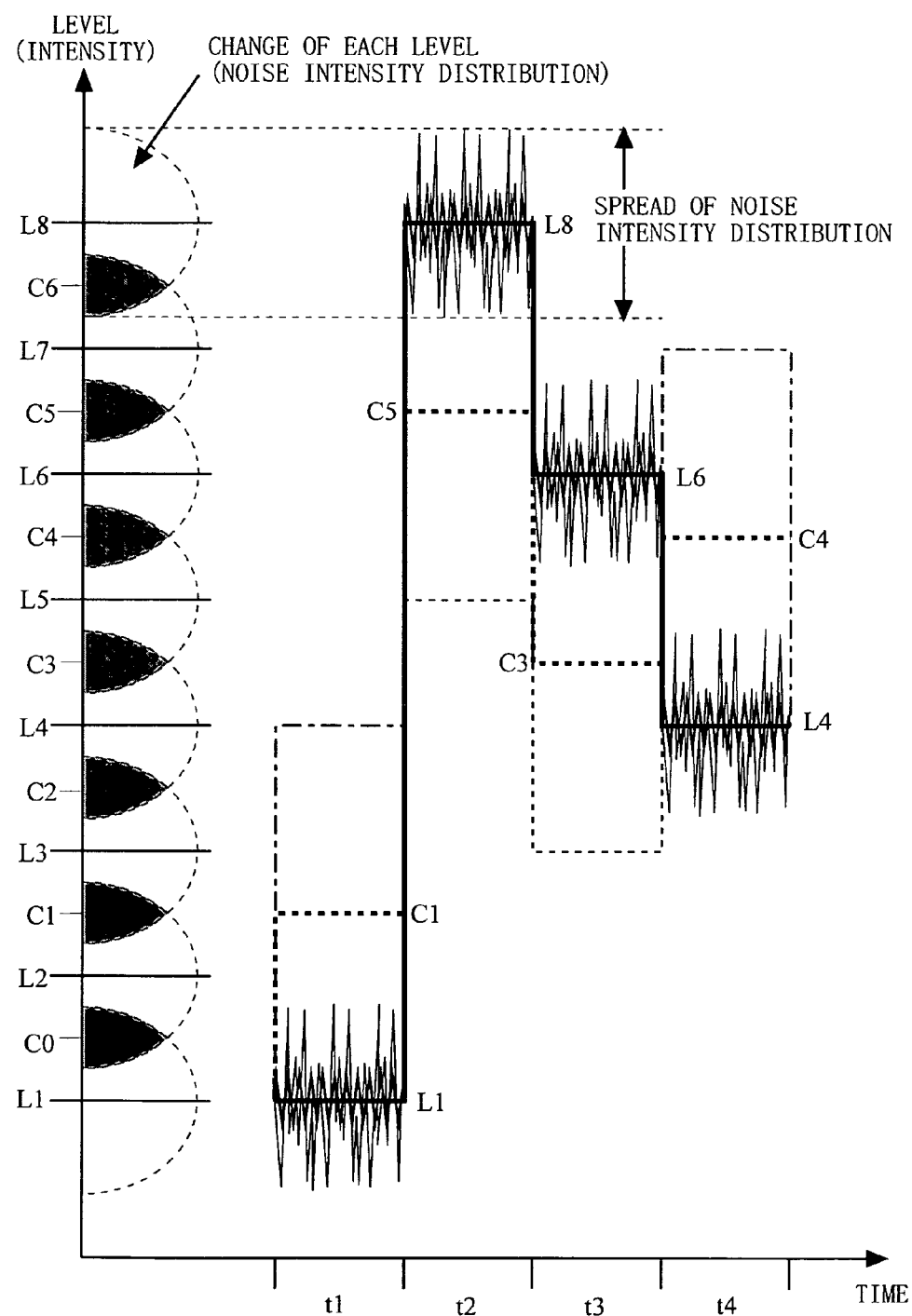
FIG. 4 is a diagram illustrating quality of the transmission signal of the data communication apparatus according to the first embodiment of the present invention.

However, in an actual transmission system, a noise occurs due to various factors, and the noise is overlapped on the modulated signal 14, whereby the respective levels of the multi-level signal 15 fluctuates temporally/instantaneously as shown in FIG. 4. In this case, a SN ratio (a signal-to-noise intensity ratio) of a signal (the multi-level signal 15), which is to be determined by the legitimate receiving end (that is, the data receiving apparatus 1201), is determined based on a ratio of the information amplitude of the multi-level signal 15 to the noise level. On the other hand, the SN ratio of the signal (the multi-level signal 15), which is to be determined by the eavesdropper's data receiving apparatus, is determined based on a ratio of the step width of the multi-level signal 15 to the noise level.

Therefore, in the case where a condition of the noise level contained in the signal to be determined is fixed, the SN ratio of the signal to be determined by the eavesdropper' data receiving apparatus is relatively smaller than that by the data receiving apparatus 1201, and thus a transmitting feature (an error rate) of the eavesdropper's data receiving apparatus is deteriorated. That is, the data communication apparatus of the present invention utilizes this feature, and leads the all-possible attack by the third party using all the thresholds to an identification error, thereby causing the eavesdropping to be difficult. Particularly, in the case where the respective step width of the multi-level signal 15 is set equal to or smaller than a noise amplitude (spread of a noise intensity distribution), the data communication apparatus substantially disables the multi-level determination by the third party.

As the noise to be overlapped on the signal to be determined (the multi-level signal 15 or the modulated signal 14), a thermal noise (Gaussian noise) contained in a space field or an electronic device, etc. may be used, in the case where an electromagnetic wave such as a wireless signal is used as the modulated signal 14, and a photon number distribution (quantum noise) at the time of a photon being generated may be used, in addition to the thermal noise, in the case where the optical wave is used. Particularly, signal processing such as recording and replication is not applicable to a signal including the quantum noise, and thus the step width of the multi-level signal 15 is set by using the quantum noise level as a reference, whereby it is possible to cause the eavesdropping by the third party to be difficult and to secure safety of the data communication.

As above described, according to the data communication apparatus according to the first embodiment of the present invention, when the information data to be transmitted is encoded as a multi-level signal, the interval between the signal levels of the multi-level signal is set appropriately with respect to a noise level so as to cause the eavesdropping by the third party to be difficult. With such setting, quality of the receiving signal at the time of the eavesdropping by the third party is crucially deteriorated, and it is possible to provide a further safe data communication apparatus which causes decryption/decoding of the multi-level signal by the third party to be difficult.

Second Embodiment

Figure 5:
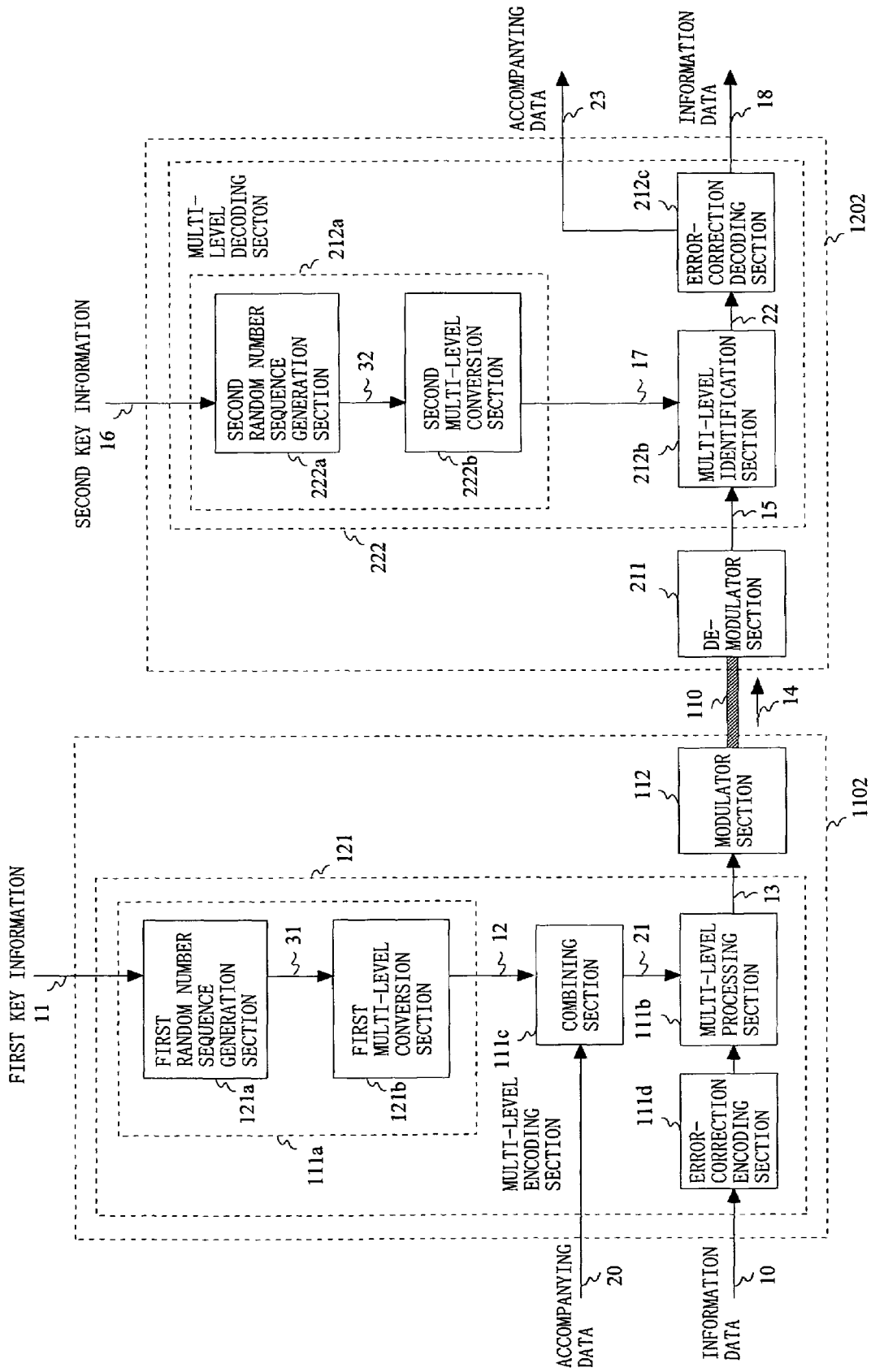
FIG. 5 is a block diagram showing a configuration of the data communication apparatus according to the second embodiment of the present invention.

FIG. 5. is a block diagram showing a configuration of a data communication apparatus according to a second embodiment of the present invention. In FIG. 5, the data communication apparatus according to the second embodiment of the present invention has a configuration in which a data transmitting apparatus 1102 and a data receiving apparatus 1202 are connected to each other via a transmission line 110. The data transmitting apparatus 1102 includes a multi-level encoding section 121 and a modulator section 112. The multi-level encoding section 121 includes a first multi-level code generation section 111a, a multi-level processing section 111b, a combining section 111c, and an error-correction encoding section 111d. The data receiving apparatus 1202 includes a demodulator section 211, and a multi-level decoding section 222. The multi-level decoding section 222 includes a second multi-level code generation section 212a, a multi-level identification section 212b, and an error correction decoding section 212c.

As shown in FIG. 5, the configuration of the data communication apparatus according to the second embodiment illustrates in detail configurations of the first multi-level code generation section 111a and the second multi-level code generation section 212a, and is different, compared to the data communication apparatus according to the above-described first embodiment, in that the configuration includes the combining section 111c, the error-correction encoding section 111d, and the error-correction decoding section 212c. Hereinafter, components which are the same as those of the above-described first embodiment will be provided with common reference characters, and explanation thereof is omitted, and the data communication apparatus according to the second embodiment will be described by mainly focusing on different components.

The first multi-level code generation section 111a includes a first random number sequence generation section 121a and a first multi-level conversion section 121b. The first random number sequence generation section 121a inputs predetermined first key information 11 (step S601 in FIG. 6), and generates a first binary random number sequence 31 ((a) of FIG. 9) by using the first key information 11. The first multi-level conversion section 121b converts, in accordance with a predetermined encoding method, the first binary random number sequence 31 in a multi-level manner, and generates a multi-level code sequence 12 ((c) of FIG. 8 and (b) of FIG. 9) in which a signal level changes so as to be approximately random numbers (step S602 in FIG. 6).

Figure 6:
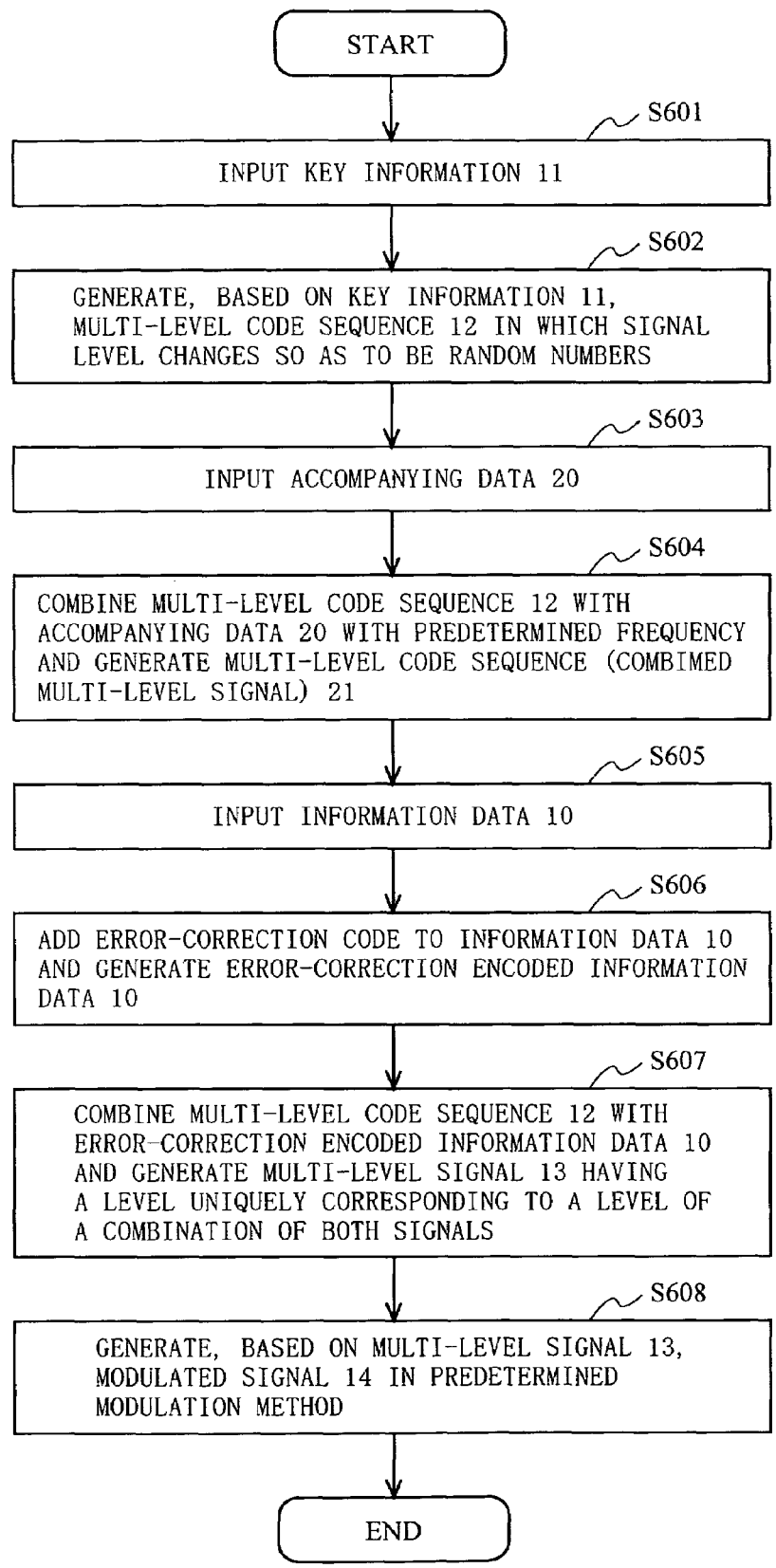
FIG. 6 is a flowchart illustrating a method executed by a data transmitting apparatus 1102 of FIG. 5.
Figure 8:
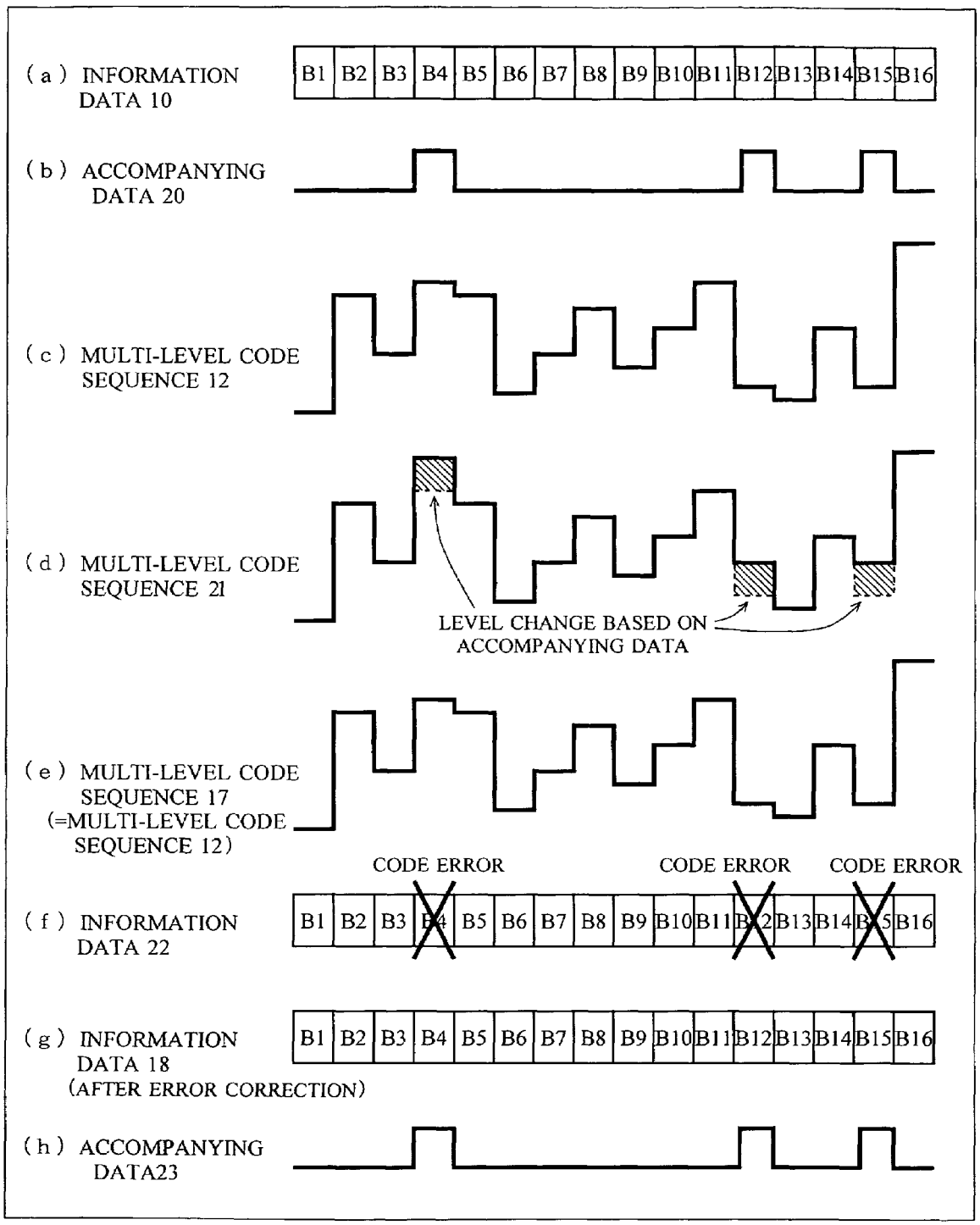
FIG. 8 is a diagram showing an action (legitimate communication) of the data communication apparatus according to the second embodiment of the present invention.
Figure 9:
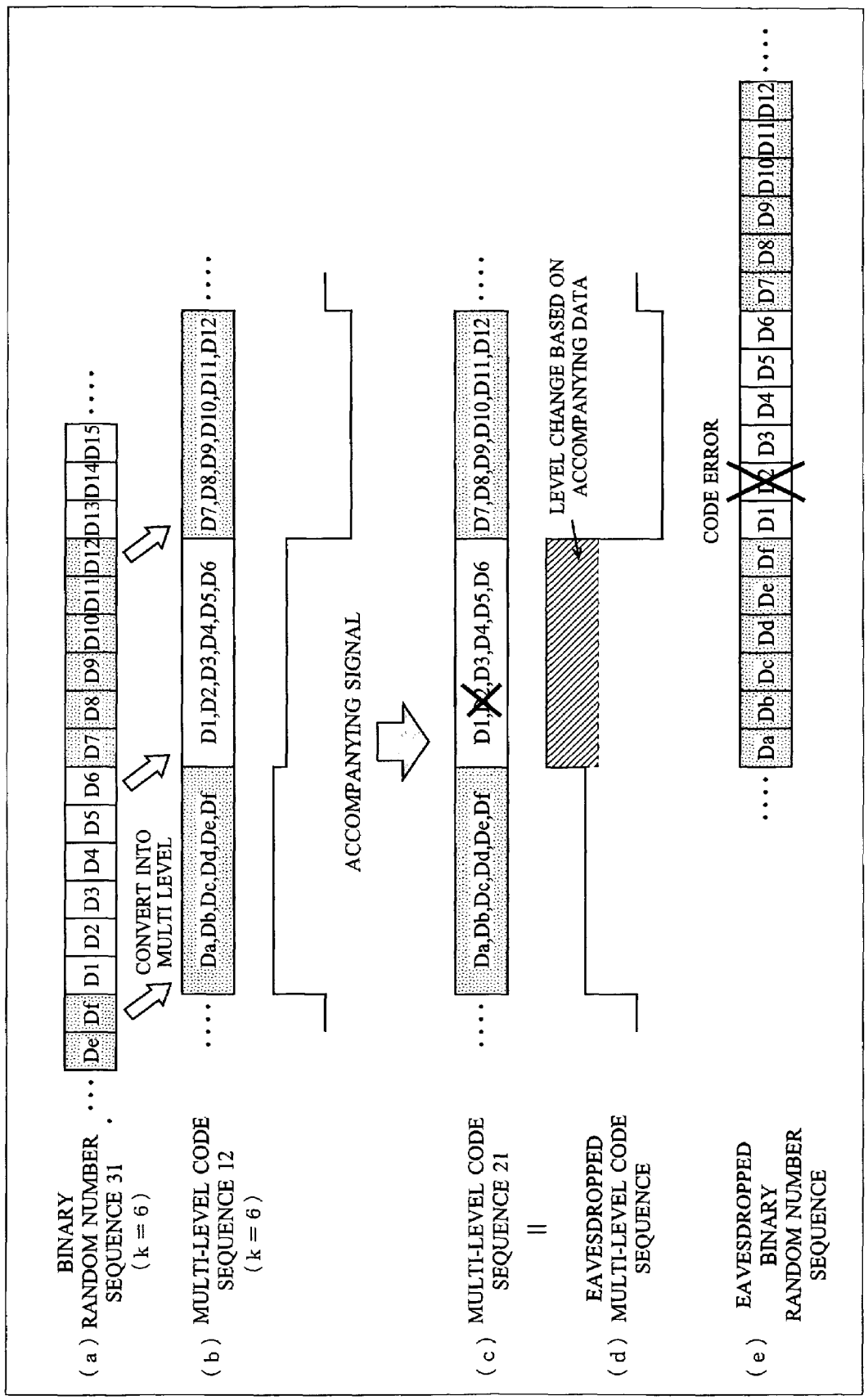
FIG. 9 is a diagram showing an action (eavesdropping) of the data communication apparatus according to the second embodiment of the present invention.

Accompanying data 20 ((b) of FIG. 8) is inputted to the combining section 111c (step S603 in FIG. 6). The accompanying data 20 is data to be used to intentionally cause the information data 10 to be misinterpreted, and, for example, a signal synchronizing with the information data 10 (an N frequency-dividing clock of information data or a predetermined code synchronizing pattern, etc.) may be used. The combining section 111c inputs the multi-level code sequence 12 and the accompanying data 20, and in accordance with logic of the accompanying data 20, generates a multi-level code sequence (a combined multi-level signal) 21 ((d) of FIG. 8 and (c) of FIG. 9) in which a signal level of the multi-level code sequence 12 is converted with predetermined frequency (step S604 in FIG. 6).

The error correction encoding section 111d inputs the information data 10 (step S605 in FIG. 6), and outputs the information data 10 to the multi-level processing section 111b after adding an error-correction code to the information data 10 (step S606 in FIG. 6). The multi-level processing section 111b inputs the multi-level code sequence 21 and the information data 10 to which the error-correction code is added by the error correction encoding section 111d ((a) of FIG. 8), combines the both signals in accordance with a predetermined procedure, and generates a multi-level signal 13 having a level uniquely corresponding to a combination of levels of the combined both signals (step S607 in FIG. 6). The modulator section 112 generates a modulated signal 14 in a predetermined modulation method, by using the multi-level signal 13 as original data, and transmits the generated modulated signal 14 to the transmission line 110 (step S608 in FIG. 6).

Figure 7:
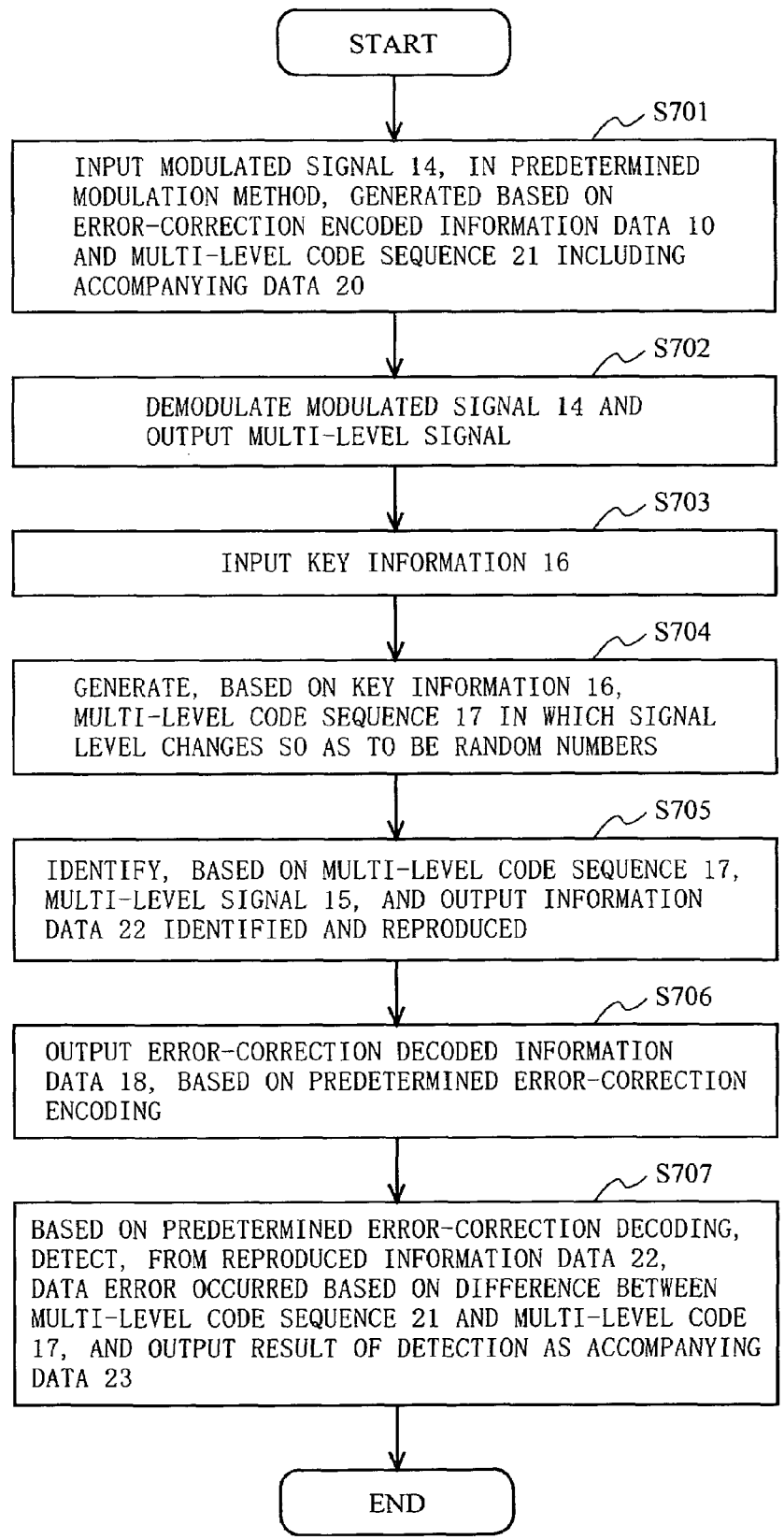
FIG. 7 is a flowchart illustrating a method executed by a data receiving apparatus 1202 of FIG. 5.

The demodulator section 211 inputs the modulated signal 14 (which is in the predetermined modulation method and generated based on the information data 10 error encoded and the multi-level code sequence 21 including the accompanying data 20) transmitted by the data transmitting apparatus 1102 via the transmission line 110 (step S701 in FIG. 7). The demodulator section 211 demodulates the modulated signal 14 and reproduces and outputs the multi-level signal 15 (step S702 in FIG. 7). The second multi-level code generation section 212a includes a second random number sequence generation section 222a and a second multi-level conversion section 222b. The second random number sequence generation section 222a inputs second key information 16 which has the same content as the first key information 11 (step S703 in FIG. 7), and generates a second binary random number sequence 32 in accordance with the second key information 16. The second multi-level conversion section 222b converts, in accordance with a predetermined encoding method, the second binary random number sequence 32, in a multi-level manner, and generates a multi-level code sequence 17 ((e) of FIG. 8) in which a signal level changes so as to be approximately random numbers (step S704 in FIG. 7).

The multi-level identification section 212b identifies the multi-level signal 15 (binary determination) by using the multi-level code sequence 17 as a threshold, and reproduces information data 22 ((f) of FIG. 8) (step S705 in FIG. 7). The error correction decoding section 212c inputs the information data 22, and reproduces and outputs information data 18 ((g) of FIG. 8) by detecting error bits of the information data 22 (or positions of the error bits: x marked positions in (f) of FIG. 8) and correcting errors of the error bits (step S706 in FIG. 7).

Here, the bit errors detected by the error correction decoding section 212c corresponds to difference between the multi-level code sequence 21 and the multi-level code sequence 17, that is, a determination error based on logic of the accompanying data 20. Therefore, by detecting the positions of the error bits, accompanying data 23 ((h) of FIG. 8) can be reproduced (step S707 in FIG. 7).

Next, eavesdropping on a modulated signal by a third party will be described. The third party does not share the first key information 11 with the multi-level encoding section 121 of the data transmitting apparatus 1102, and thus performs simultaneous determination by means of the all-possible attack by preparing thresholds with respect to all intervals between respective signal levels possibly taken by a demodulated multi-level signal, and analyzing a result of the determination, thereby extracting correct key information or information data. Here, as a analyzing method of the key information by the third party, there may be, for example, a method of decrypting the first key information 11 by generating, based on a result of the determination, a binary random number sequence corresponding to the first binary random number sequence 31 ((a) of FIG. 9) generated by the data transmitting apparatus 1102, and by obtaining, from the binary random number sequence, consecutive bits (2 kbits) whose length is twice as long as key length k of the first key information 11. On the other hand, in the present invention, the signal level of the multi-level code sequence 12 is converted depending on the accompanying data 20 in the data transmitting apparatus 1102, whereby difference between the first binary random number sequence 31 ((a) of FIG. 9) generated in the data transmitting apparatus 1102 and the binary random number sequence ((e) of FIG. 9) generated based on the result of the determination are provided. Accordingly, it is possible to prevent obtainment by the third party of correct consecutive bits ($2k$), and cause decryption of the first key information 11 to be difficult.

As above described, the data communication apparatus according to the second embodiment of the present invention adds the error-correction code to the information data 10 to be transmitted, and utilizes the accompanying data 20 so as to cause the multi-level code sequence 21 in the data transmitting apparatus 1102 to be in discord with the multi-level code sequence 17 in the data receiving apparatus 1202, thereby encrypting transmitting data and correcting errors in receiving data occurring in the data receiving apparatus 1202. Accordingly, it is possible to transmit/receive the information data 18 and the accompanying data 23 simultaneously and realize a highly concealable data communication apparatus.

Third Embodiment

Figure 10:
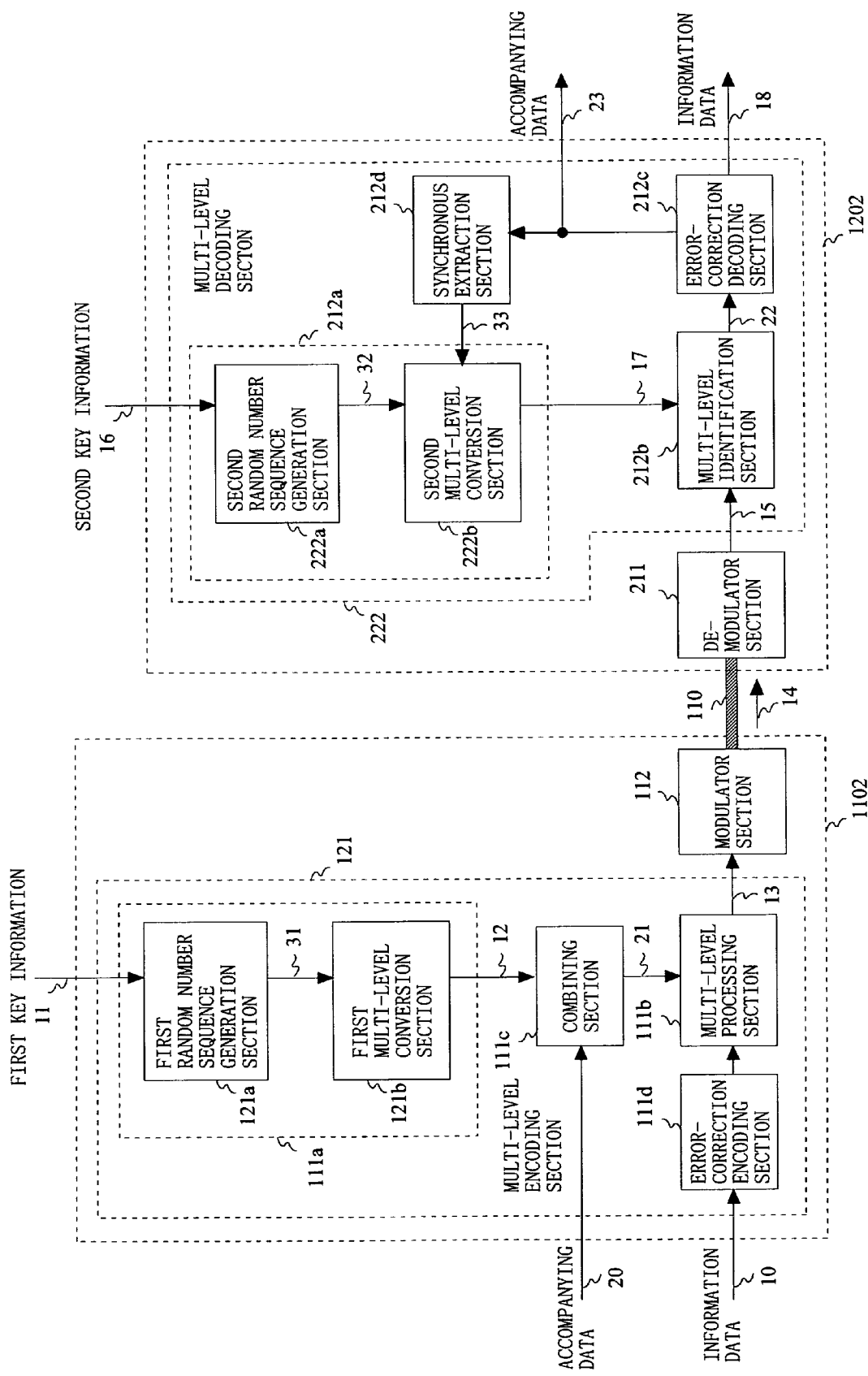
FIG. 10 is a block diagram showing a configuration of the data communication apparatus according to the third embodiment of the present invention.

FIG. 10 is a block diagram showing a configuration of a data communication apparatus according to a third embodiment of the present invention. In FIG. 10, the data communication apparatus according to the third embodiment has a configuration in which a data transmitting apparatus 1102 and a data receiving apparatus 1203 are connected to each other via a transmission line 110. The data transmitting apparatus 1102 includes a multi-level encoding section 121 and a modulator section 112. The data receiving apparatus 1203 includes a demodulator section 211 and a multi-level decoding section 232. The multi-level decoding section 232 includes a second multi-level code generation section 212a, a multi-level identification section 212b, an error correction decoding section 212c, and a synchronous extraction section 212d.

As shown in FIG. 10, the configuration of the data communication apparatus according to the third embodiment is different, compared to the data communication apparatus according to the above-described second embodiment, in that the configuration includes the synchronous extraction section 212d. Hereinafter, with respect to such components that are the same as those of the above-described second embodiment, description thereof will be omitted by providing common reference characters, and the data communication apparatus according to the third embodiment will be described by mainly focusing on different components.

The second random number sequence generation section 222a generates a second binary random number sequence 32 in accordance with second key information 16 which has the same content as first key information 11. The second multi-level conversion section 222b inputs a synchronous signal 33, converts the second binary random number sequence 32, in a multi-level manner, into a multi-level code sequence 17, which is then synchronized with the synchronous signal 33 and generated. The multi-level identification section 212b identifies the multi-level signal 15 (binary determination) by using the multi-level code sequence 17 as a threshold, and reproduces information data 22. The error-correction decoding section 212c inputs the information data 22, and simultaneously reproduces information data 18 and accompanying data 23 by detecting error bits of the information data 22 and by correcting errors of error bits. The synchronous extraction section 212d inputs the accompanying data 23, extracts the synchronous signal 33, which is in synchronization with the accompanying data 23, and outputs to the second multi-level conversion section 222b.

In accordance with this action, in the case where, in the data transmitting apparatus 1102, the information data 10 and the accompanying data 20 are in synchronization with each other, it is possible to obtain synchronization between the multi-level code sequence 17 generated, based on the synchronous signal 33, by the second multi-level code generation section 212a and the multi-level signal 15 outputted from the demodulator section 211. Accordingly, the multi-level signal 15 can be synchronized with and identified by the multi-level code sequence 17.

As above described, the data communication apparatus according to the third embodiment of the present invention adds error-correction code to the information data 10, and causes the multi-level code sequences 21 and 17, which are respectively in the data transmitting apparatus 1102 and the data receiving apparatus 1203, to be in discord with each other by using the accompanying data 20 synchronizing with the information data 10, and thereby encrypting transmitting data and correcting errors in receiving data occurring in the data receiving apparatus 1202. Accordingly, it is possible to transmit/receive the information data 18 and the accompanying data 23 simultaneously and realize a highly concealable data communication apparatus. Further, it is possible to realize a data communication apparatus of a simple configuration having a synchronous system, by extracting the synchronous signal 33 from the accompanying data 20 and by synchronizing and identifying the multi-level signal 15 using the multi-level code sequence 17 generated based on the synchronous signal 33.

While the invention has been described in detail, the foregoing description is in all aspects illustrative and not restrictive. It is understood that numerous other modifications and variations can be devised without departing from the scope of the invention.

What is claimed is:

1. A data transmitting apparatus for performing cipher communication, the data transmitting apparatus comprising:
    a multi-level code generation section for generating a multi-level code sequence in which a signal level changes in accordance with a random number sequence determined based on predetermined key information;
    a combining section for combining accompanying data to the multi-level code sequence with predetermined frequency and generating a combined multi-level signal;
    an error-correction encoding section for adding an error-correction code to information data, in accordance with predetermined error correction encoding processing, and outputting error-correction encoded information data;
    a multi-level processing section for combining the combined multi-level signal and the error-correction encoded information data in accordance with predetermined processing, and generating a multi-level signal having a level uniquely corresponding to a combination of levels of both combined signals represented by the combined multi-level signal and the error-correction encoded information data; and
    a modulator section for generating a modulated signal, in a predetermined modulation method, based on the multi-level signal.

2. The data transmitting apparatus according to claim 1, wherein the accompanying data is a synchronous signal which is synchronizing with the information data.

3. The data transmitting apparatus according to claim 1, wherein the accompanying data is an N frequency-dividing clock of the information data.

4. The data transmitting apparatus according to claim 1, wherein the accompanying data has a predetermined code-synchronous pattern.

5. A data transmitting method for performing cipher communication, the data transmitting method comprising:
    generating, with a multi-level code generation section, a multi-level code sequence in which a signal level changes in accordance with a random number sequence determined based on predetermined key information;
    combining, with a combining section, accompanying data to the multi-level code sequence with predetermined frequency and generating a combined multi-level signal;
    adding, with an error-correction encoding section, an error-correction code to information data, in accordance with predetermined error-correction encoding processing, and outputting the error-correction encoded information data;
    combining, with a multi-level processing section, the combined multi-level signal and the error-correction encoded information data in accordance with predetermined processing, and generating a multi-level signal having a level uniquely corresponding to a combination of levels of both signals represented by the combined multi-level signal and the error-correction encoded information data; and
    generating, with a modulator section, a modulated signal, in a predetermined modulation method, based on the multi-level signal.

* * * * *